United States Patent [19]

Lerbet et al.

[11] Patent Number: 5,569,362

[45] Date of Patent: Oct. 29, 1996

[54] PROCESS FOR TREATMENT OF THIN FILMS BASED UPON METALLIC OXIDE OR NITRIDE

[75] Inventors: Francois Lerbet, Paris; Daniele Pillias, Aulnay Sous Bois, both of France

[73] Assignee: Saint-Gobain Vitrage International, Courbevoie, France

[21] Appl. No.: 165,493

[22] Filed: Dec. 13, 1993

[30] Foreign Application Priority Data

Dec. 11, 1992 [FR] France ................................. 92 14911

[51] Int. Cl.$^6$ ............................ C23C 14/34; C23C 14/58
[52] U.S. Cl. ............................ 204/192.16; 204/192.15; 204/192.23; 204/192.26
[58] Field of Search ........................... 204/192.1, 192.11, 204/192.12, 192.15, 192.23, 192.26, 192.27, 192.28, 192.34, 298.02, 298.04, 298.23, 298.25, 298.26, 192.16, 192.3

[56] References Cited

U.S. PATENT DOCUMENTS

| | | | |
|---|---|---|---|
| 3,890,109 | 6/1975 | Jones ................................. | 204/192.15 |
| 4,395,467 | 7/1983 | Vossen, Jr. et al. ..................... | 428/697 |
| 4,793,908 | 12/1988 | Scott et al. ........................... | 204/192.26 |
| 4,851,095 | 7/1989 | Scobey et al. ......................... | 204/192.12 |
| 4,920,094 | 4/1990 | Nogawa et al. ..................... | 204/192.11 |
| 4,933,058 | 6/1990 | Bache et al. ......................... | 204/192.16 |
| 5,122,252 | 6/1992 | Latz et al. ............................ | 204/192.12 |
| 5,346,600 | 9/1994 | Nieh et al. ............................ | 204/192.3 |

FOREIGN PATENT DOCUMENTS

| | | | |
|---|---|---|---|
| 1-183496 | 7/1989 | Japan ................................ | 204/192.11 |
| 02713 | 5/1987 | WIPO .............................. | 204/192.11 |
| WO-A-9 117 283 | 11/1991 | WIPO . | |

OTHER PUBLICATIONS

"Ion Implantation and ion beam processing of materials" Hubler et al., Materials Research Society Symposium Proceedings, vol. 27, pp. 765–770.

Ion Implantation and Ion Beam Processing of Materials, Hublet et al., Materials Research Society Symposia Proceedings, vol. 27, pp. 765–770.

*Primary Examiner*—Robert Kunemund
*Assistant Examiner*—Rodney G. McDonald
*Attorney, Agent, or Firm*—Oblon, Spivak, McClelland, Maier & Neustadt, P.C.

[57] ABSTRACT

A treatment process for the purpose of improving the chemical and/or physical durability of film containing one or more metallic oxides, nitrides, oxynitrides or oxycarbides deposited on a transparent substrate by a cathodic sputtering technique, notably assisted by a magnetic field and preferably reactive in the presence of oxygen. Said process consists of subjecting the film to a low energy ion beam.

12 Claims, 3 Drawing Sheets

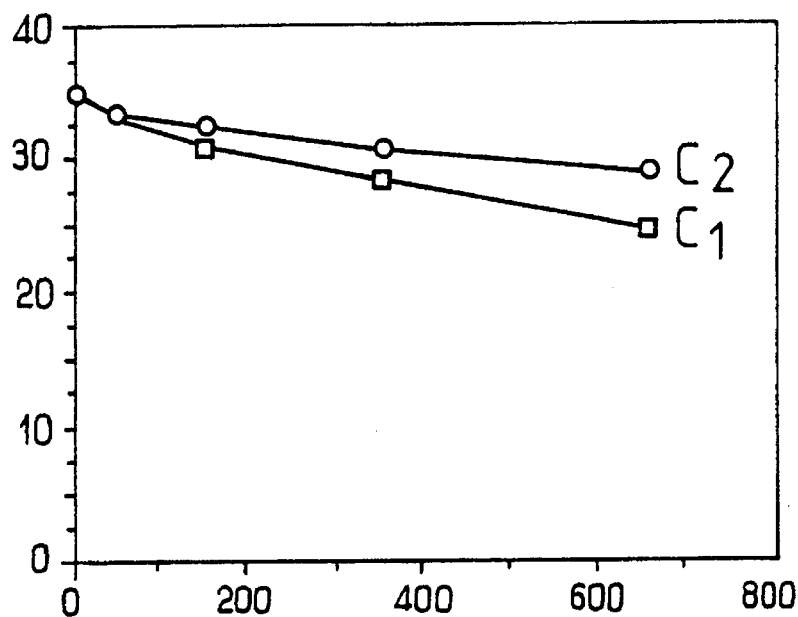
FIG_1
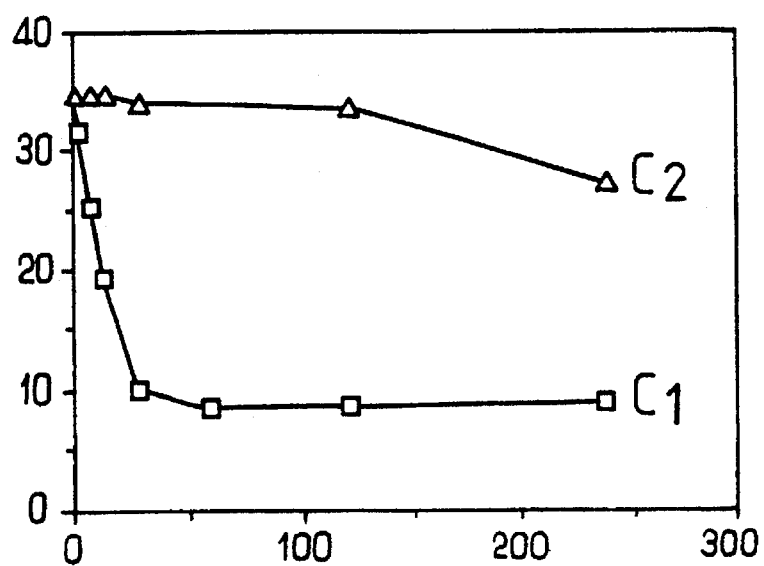
FIG_2

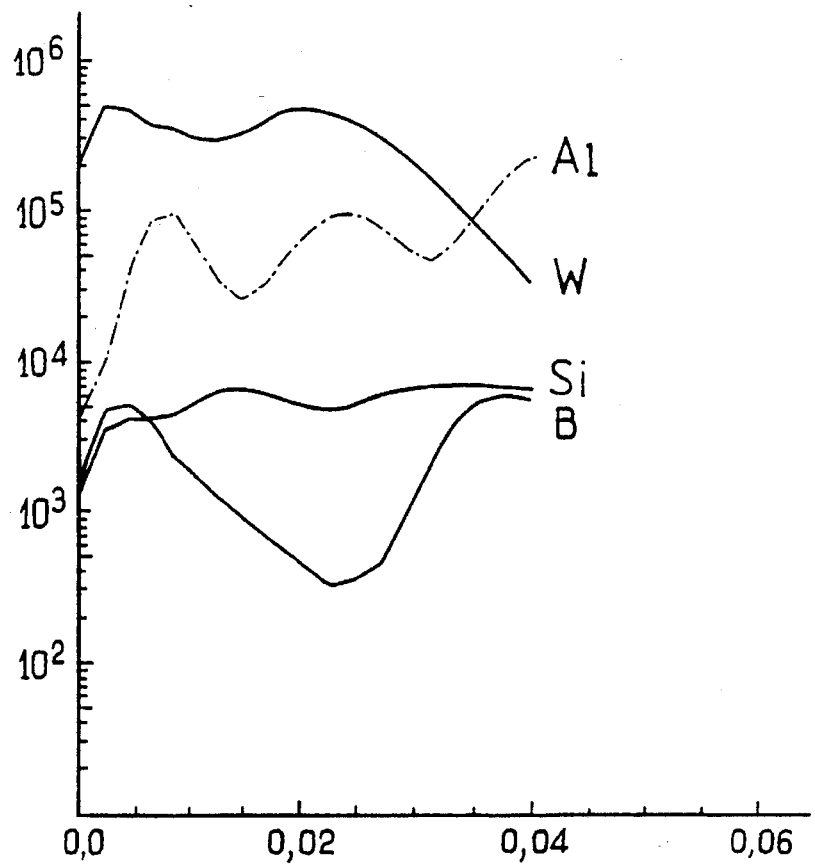
FIG_3
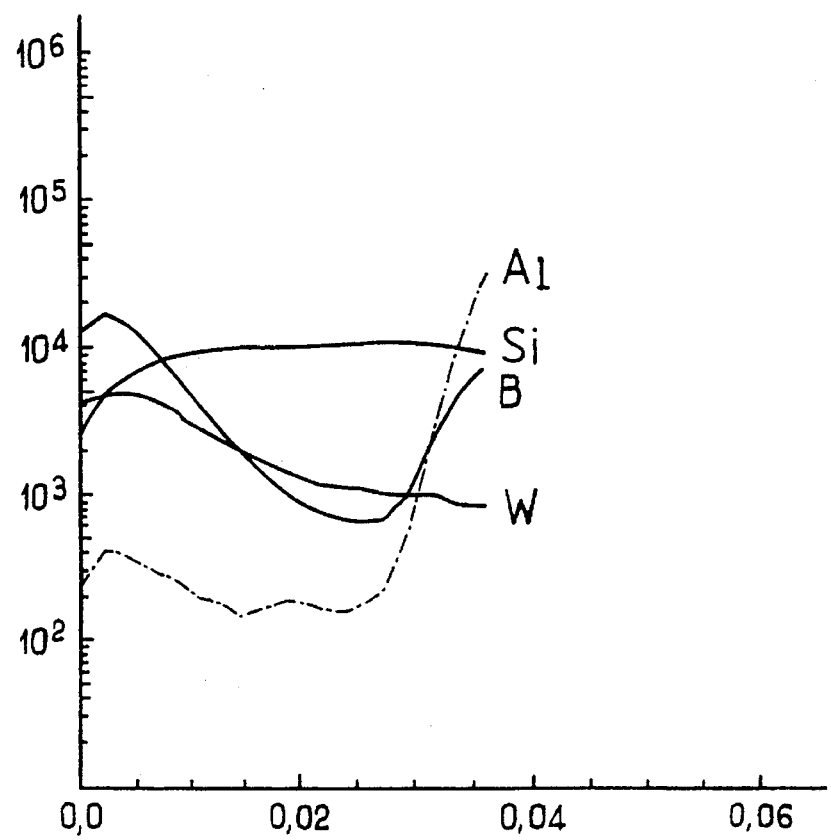
FIG_4

5,569,362

PROCESS FOR TREATMENT OF THIN FILMS BASED UPON METALLIC OXIDE OR NITRIDE

BACKGROUND OF THE INVENTION

Field of the Invention

The invention relates to a process for the treatment of thin films comprising one or more metallic oxides, nitrides, oxynitrides or oxycarbides, and more especially such films deposited on a transparent substrate, notably of glass, by means of a technique using vacuum, either directly or through the intermediary of other films. The invention also concerns the application of this process to the production of panes.

DISCUSSION OF THE BACKGROUND

For the purpose of manufacturing panes known as "functional" there is usually deposited onto at least one of the substrates of which they are composed a thin film or stack of thin films, for the purpose of imparting optical properties, for example antireflective properties, properties in the infrared (low-emissivity) and/or electrical conductivity properties. Films comprising metallic oxide and/or nitride are very commonly used, for example as a dielectric on either side of a low-emissivity film of the silver or doped metallic oxide film type; or as an interferential film in alternating stacks of oxides or nitrides having high and low indices of refraction.

The problem then arises of the chemical and/or physical durability of these films or film stacks, a problem that becomes all the more crucial when the coated substrate is intended for use as monolithic glazing pane, the film or films then being directly exposed to attack from the ambient atmosphere. Even when the substrate is intended to form part of a multiple pane (double glazing, laminated pane), the films are still subject to attack from the various handlings that occur during manufacture of the pane.

An experimental technique known as IAD (Ion-Assisted Deposition) is known, notably from the publication "Ion-based methods for optical thin film deposition" (Journal of Material Science; J. P. Martin, 21 (1986) 1–25), involving assistance to the deposition by ion beams, which enables the structure of thin oxide films to be modified. This technique consists of performing the deposition of the film by an evaporation technique while subjecting the film throughout its deposition to bombardment by oxygen or argon ions, which enables its compactness and its adhesion to the carrying substrate to be increased, by a phenomenon that is still not fully understood. However, this type of assisted deposition is very complex to carry out, and in fact it is only applicable to substrates of very small dimensions due to the problems of convergence between, on one hand, the ion beam and, on the other hand, the particles resulting from evaporation originating from a very localized source, which cause the film to grow on the substrate.

Patent Appl. EP-A-0 328 257 discloses a technique for the deposition of oxide films by cathodic sputtering, the purpose of which is to accelerate the rate of deposition by operating as follows: first of all, the deposition is carried out of a metal film from a suitable metallic target in an inert atmosphere, then the metal film is converted into a metallic oxide film by subjecting it to a source of ions capable of generating a plasma of oxidizing ions. The ion source is, therefore, responsible for a chemical oxidizing transformation, the intended application being essentially for optical glasses and not for panes.

There is a need for a treatment process for films containing one or more oxides, nitrides, oxynitrides or oxycarbides, for the purpose of making them more chemically and/or physically resistant, a treatment which alleviates the aforementioned disadvantages, that is to say one which can be carried out whatever the size of the substrate, and on an industrial scale.

SUMMARY OF THE INVENTION

An object of the present invention is to provide a process for the treatment of films of one or more metallic oxides, nitrides, oxynitrides or oxycarbides deposited on a transparent substrate, notably of glass, by a cathodic sputtering technique, notably assisted by a magnetic field and preferably reactive in the presence of oxygen and/or nitrogen, said process consisting of subjecting the film thus deposited to an ion beam of low energy.

BRIEF DESCRIPTION OF THE DRAWINGS

FIG. 1 shows the results of a Taber test on a standard film of $TiO_2$ (curve C1) and a film of $TiO_2$ according to example 1. FIG. 2 shows the results of an HCl test on a standard film of $TiO_2$ (curve C1) and a film of $TiO_2$ according to example 1.

FIG. 3 is a SIMS measurement of the film of example 7.

FIG. 4 is a SIMS measurement of a standard film of $SiO_2$ doped with boron.

DETAILED DESCRIPTION OF THE PREFERRED EMBODIMENTS

Figure 5:
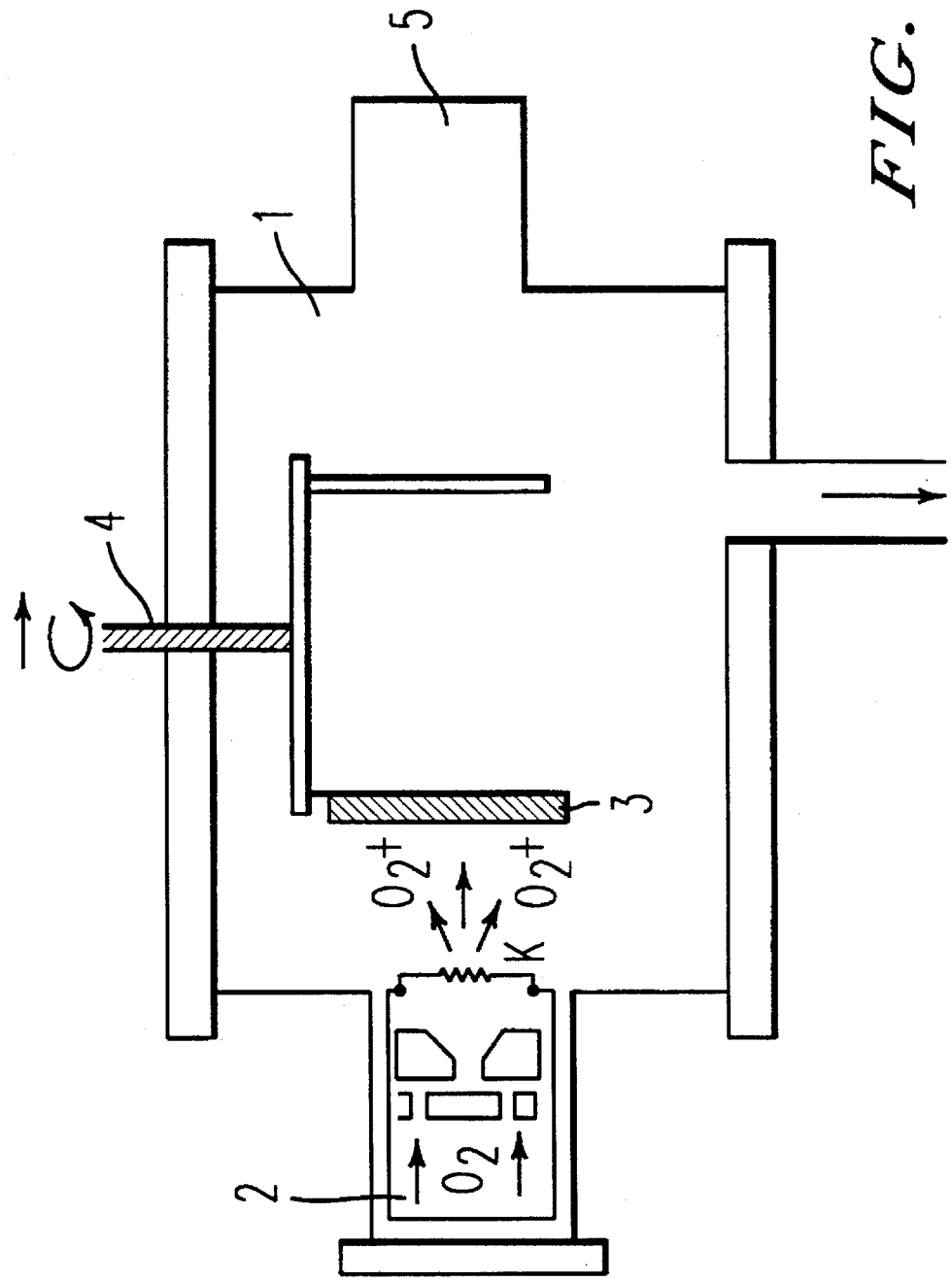
FIG. 5 is a simplified drawing representing an enclosure 1 equipped with an ion gun 2, a magnetron 5, the substrate 3 held vertically by support means 4 which is either pivotable around a vertical axis or translatable.

Within the context of this invention, the expression ion beam "of low energy" is to be understood as being a beam having parameters that are chosen in such a way as to limit, as far as possible, the sputtering of the film formed under the impact of the ions of the beam. This concept is, of course, to be taken into account according to the intrinsic sputtering rate for each material envisaged.

The treatment according to this invention makes it possible to increase the physical and/or chemical durability of these films, which may perhaps be explained both by a densifying of the films, which may lead specifically to an increase in their refractive index, and by a certain "smoothing" of the surface. The films treated according to this invention have a lower surface rugosity than the standard films deposited by cathodic sputtering. This latter characteristic may thus, in addition, advantageously promote a better bond and better "wetting" of a film deposited later onto the thus treated film.

The inventors have discovered that, surprisingly, the desired objective is achieved by using the cathodic sputtering deposition technique, which is perfectly adapted to industrial requirements for the manufacture in large series of panes of all sizes, in association with an ion beam treatment. It is possible to completely separate the deposition step and the step of treatment by ion beam. This dissociation thus eliminates all the problems encountered in the known techniques of assisted deposition and makes the process easy to carry out insofar as the deposition is performed by a proven industrial technique and insofar as the ion beam treatment may be carried out consecutively with the deposition, in the same installation.

It is also possible to perform the deposition of the film and its treatment by ion beam simultaneously. This embodiment is a little more difficult to achieve, but nevertheless it is still feasible because here, in contrast to the deposition techniques of the evaporation type, the sputtering technique uses a material source, the target, of appreciable dimensions which is situated close to the substrate to be covered. It is therefore relatively easy to obtain a good "convergence" between the particles issuing from the target and the ions issuing from the beam arriving at the substrate to be covered. This simultaneously enables the effectiveness of the treatment by ion beam throughout the thickness of the film to be assured to the greatest possible extent.

One preferred embodiment of the invention consists, however, of performing the deposition of the film in sequential manner, and of arranging for at least one of the sequential deposition steps to be followed by at least one ion beam treatment step. It is advantageous to systematically alternate sequential deposition and ion beam treatments. For example, when the final desired thickness is of the order of at least 30 nanometers it is advantageous to deposit the film by a succession of sequential depositions, preferably of 5 to 30 nanometers, notably of 15 to 20 nanometers. When the final desired thickness is smaller, the sequential depositions should be of the order of 5 nanometers and alternated with a treatment by ion beam. In this way it is possible to optimize the effectiveness of the ion beam and to densify the film to the maximum possible extent. In fact, it is then possible to carry out all possible compromises, notably in terms of thickness deposited during each of the sequential steps and of regulation of the beam, as a function of the nature of the film, its final thickness, its desired physical and mechanical performance, and as a function of industrial requirements. Generally speaking, the duration of each treatment by ion beam is preferably less than 30 minutes, notably from 1 to 10 minutes.

Furthermore, the adhesion between film and substrate is improved if, before any deposition, a pretreatment is carried out consisting of subjecting the bare substrate to the ion beam.

The characteristics of the ion beam are very evidently important. In the case of deposition of oxides, oxynitrides or oxycarbides, it is preferable to use a beam, at least a portion of the ions of which are of an oxidizing nature, such as ionized oxygen. But at least a portion of the ions may also be, for example, of ionized argon or ionized nitrogen, notably in the case of deposition of nitrides.

The energy of the so-called "low energy" beam, as already mentioned should be low enough not to sputter the treated film excessively, while at the same time being high enough so that, under impact of the ions, the film shall be effectively rendered more resistant. The value of the energy should also be adapted to the thickness of the film that is struck by the ion beam, and to the ease of sputtering of the material from which the film is formed. In practice, energy values of the ions at their impact on the film are preferred which are less than or equal to 500 electron-volt, notably less than or equal to 200 eV, for example between 250 eV and 50 eV and particularly of the order of 80 to 100 eV.

Similarly, the ion density of the ion beam is preferably controlled so as to be of the order of from one to several milliamperes per cm$^2$.

The process according to this invention is applicable, notably, to films of titanium oxide or tantalum oxide, to films of zinc oxide or tin oxide, of silicon oxide or nitride and of titanium nitride.

The invention also has as its object a device for carrying out the process described above, said device being provided with at least one cathode equipped with a suitable target, and with at least one ion beam source, such as an ion gun, either in a single sputtering enclosure or in two distinct enclosures. In the case of separate enclosures it is then possible to choose, in each of these enclosures, conditions of pressure and atmospheric composition that are either slightly different or identical.

The substrate may be movably mounted relative to the target and gun in such a way it can be consecutively covered with a thin film by sputtering from the target and then treated by the ion beam generated by the beam source. An installation for carrying out the invention thus comprises, for example, an enclosure in which are disposed alternately cathodes and ion guns, in such a way that the substrate to be treated travels in a linear, successive and horizontal manner opposite said devices. In the case where deposition and beam treatment are simultaneous, the ion beam source and the cathode equipped with the target are disposed in an appropriate manner with respect to the substrate in such a way that there shall be appropriate convergence of the particles issuing from the target and of the ions of the beam.

The invention also has as its object the films thus produced, exhibiting a hardening or a greater durability, and/or a greater density and/or a less high rugosity than the films deposited by simple cathodic sputtering. These films may thus be used for the production of panes.

Other details and advantageous characteristics of the invention will become apparent from the description given below of non-limiting examples, with the help of FIGS. 1 and 2, which allows the performance of the films to be evaluated by means of two tests described below, and also FIGS. 3 and 4, which give by mass spectroscopy the structure of a film treated according to this invention.

All of these examples relate to the sequential deposition of a thin film based upon titanium oxide, tantalum oxide, tin oxide or silicon oxide, onto a substrate of clear silicosodocalcic glass of dimensions 15×10 cm$^2$ by means of a cathodic sputtering device assisted by a magnetic field and in a reactive atmosphere comprising oxygen. The targets to be sputtered are, respectively, of titanium, tantalum, tin or doped silicon, the vertical cathode has a length of 210 mm and a width of 90 mm. The glass substrate is vertically movable, because it is fixed to a carousel, which enables the deposition by sputtering of the target and the treatment by ion beam of the film deposited to be carried out alternately, the beam being generated by an ion gun disposed on an axis perpendicular to the substrate and sold under the trade name Commonwealth Mark II® by the Commonwealth Scientific Company. This type of gun emits, in the present case, a beam of oxygen ions, the ion density of which, measured at 15 cm from the emission source, is approximately 1.2 mA/cm$^2$. During the treatment, the substrate is at approximately 14 cm from the point of emission of the beam.

In the following examples, before any deposition is carried out, a pretreatment is performed of the substrate by subjecting it for one minute to the oxygen ion beam, under an energy less than or equal to 60 eV and an ion density of at least 0.7 mA/cm$^2$.

For evaluating the chemical and physical durability of the films treated according to this invention, these films were subjected, notably that of the first example, to two types of tests: the test known as "Taber" is a test enabling the abrasion resistance of the film to be assessed. It is carried out by the use of grinding wheels made of abrasive powder embedded in an elastomer. The machine is manufactured by the Taber Instrument Corporation in the United States. This is a model 174, "Standard Abrasion Tester" and the grinding wheels are of type CS10F loaded with 500 grams. The film is subjected to 650 revolutions. Its abrasion is measured by the progressive reduction of its light reflection $R_L$ at a wavelength of 550 nm.

The test known as the "HCl test" consists of immersing the coated substrate in an aqueous solution of HCl of concentration 1 mole/liter and heating to 100° C. until the film is degraded: this effect is also manifested by a reduction in $R_L$.

Some of the results of these tests are assembled in the attached figures.

In addition, the surface state of the films was analyzed by an atomic force microscope. It was thus possible to evaluate their rugosity, measured by the value of the root mean square (RMS) of the variation on an area of one micrometer square and expressed in Angstrom units.

EXAMPLE 1

The pretreatment of the substrate was carried out with the beam under an energy of 60 eV and an ion density of 0.7 mA/cm$^2$. By three sequential depositions of 15 nm, a film of titanium oxide of 45 nm thickness was deposited. Each deposition was performed under the following conditions:

pressure: 0.264 Pa (2×10$^{-3}$ torr)

atmosphere: argon/oxygen, comprising 15% by vol. oxygen power applied: 2.4 watt/cm$^2$.

Each of these depositions was followed by a treatment with the oxygen ion beam under the following conditions:

energy of the ions on impact on the film: 84 eV ion density: 1.2 mA/cm$^2$ duration of treatment: 5 minutes.

The film obtained is densified, which results in a non-negligible increase in its refractive index, equal to 2.45, whereas a film of TiO$_2$, hereinafter referred to as "standard," of the same thickness deposited in the same conditions but without treatment by ion beam, has an index of 2.37. It is much less rough at the surface because the root mean square of the rugosity is only 14 Angstrom units (1.4 nm), whereas that of the standard film reaches 35 Angstrom units (3.5 nm).

FIGS. 1 and 2 show the respective results of the "Taber" and "HCl" tests on a film of standard TiO$_2$ (curves C1) and on the film according to Example 1 (curves C2). In FIG. 1, the number of abrasion revolutions is given on the abscissa the light reflection value $R_L$ in percentage on the ordinate. In FIG. 2, the abscissa shows the time in minutes and the ordinate the value of $R_L$. The figures clearly show that the film of Example 1 is much more resistant to mechanical abrasion and acid attack than the standard film.

EXAMPLE 2

Repeating the pretreatment conditions, the deposition and the ion beam treatment of Example 1, a film of titanium oxide of 900 nm thickness was deposited in 6 sequential depositions alternating with 6 beam treatments.

The thus treated film is densified, its refractive index being 2.52 instead of 2.37 for a "standard" film of the same thickness. Its rugosity is, furthermore, reduced by a considerable proportion, because its root mean square rugosity is only 2.6 Angstrom units (0.26 nm) whereas a "standard" film has a root mean square of 35 Angstrom units (3.5 nm).

EXAMPLE 3

The pretreatment of the substrate is carried out by using a beam of energy adjusted to 45 eV and an ion density of 1.4 mA/cm$^2$. Then a film 15 nm thick of titanium oxide is deposited by 3 sequential depositions of 5 nanometers each, alternating with 3 ion beam treatments under the same conditions as in the preceding examples. Its chemical resistance was evaluated by the "HCl" test in comparison with a "standard" film of TiO$_2$ of the same thickness, that is to say deposited by cathodic sputtering without ion beam treatment.

After 8 minutes, the "standard" film was completely degraded, the value of $R_L$ measured was that of the bare glass. In contrast, the film treated according to the present invention was resistant, because it did not completely degrade until after 2 hours ($R_L$ equal to 9.3% after 2 hours).

EXAMPLE 4

A 25 nm film of tantalum oxide is deposited in a single deposition. The deposition is performed in the following conditions:

pressure: 0.264 Pa (2×10$^{-3}$ torr)

atmosphere: argon/oxygen, comprising 30% by vol. oxygen power applied: 1.45 W/cm$^2$.

This deposition is followed by an oxygen ion beam treatment under the following conditions:

energy of the ions at impact on the film: 84 eV ion density: 1.2 mA/cm$^2$ duration of treatment: 5 minutes.

The treated film is densified. Its root mean square rugosity is 1.9 Angstrom units (0.19 nm), whereas that of a tantalum oxide film of the same thickness deposited by the same deposition method but not treated is 4.1 Angstrom units (0.41 nm).

EXAMPLE 5

A pretreatment of the substrate is carried out using a beam with energy of 45 eV and an ion density of 1.4 mA/cm$^2$, for 1 minute. A final film of 30 nm thickness of tin oxide SnO$_2$ is deposited by 3 sequential depositions of 23 nm each:

pressure: 0.2 Pa (1.5×10$^{-3}$ torr)

atmosphere: argon/oxygen, comprising 69% by vol. oxygen power applied: 0.9 watt/cm$^2$.

Each of the depositions is followed by a treatment by the oxygen ion beam under the following conditions:

energy of the ions on impact on the film: 84 eV ion density: 1.9 mA/cm$^2$ duration of treatment: 3 minutes.

The film obtained is hardened to a very significant extent, which is reflected, notably, by an exceptional chemical durability. Both this film and a "standard" film of SnO$_2$ of 30 nm thickness, deposited by a sputtering step but without ion beam treatment, were subjected to the "HCl test". The "standard" film became degraded totally after 30 minutes, whereas the film according to this did not exhibit any significant trace of degradation after 48 hours.

It is to be noted that the tin oxide of the film, known for possessing a high sputtering rate, now had a tendency to re-atomize (resputter), because after 3 depositions of 23 nm a film of only 30 nm is finally obtained. It is confirmed here that, for an ion beam of the same energy (84 eV), the limited or not limited resputtering effect of the treated film depends upon the material in question. Limited resputtering does not have notable harmful consequences, except perhaps in terms of cost of raw materials, a cost which in the present case is reasonable for tin oxide.

EXAMPLE 6

A pretreatment of the substrate is carried out as in Example 5. There is then deposited, by radio frequency in a single operation, 30 nm of silicon oxide $SiO_2$ doped with boron (a few percent) under the following conditions:

pressure: 0.2 Pa ($1.5 \times 10^{-3}$ torr)

atmosphere: argon/oxygen, including approximately 30% by vol. oxygen power applied: 2.6 watt/cm$^2$.

The deposition is followed by a treatment by the oxygen ion beam under the following conditions:

energy of the ions at impact on the film: 60 eV ion density: 2.2 mA/cm$^2$ duration of treatment: 5 minutes.

It is observed that the film treated in this way is more durable, notably in terms of resistance to chemical attack, and more especially resistance to alkalines.

EXAMPLE 7

A pretreatment of the substrate is carried out as in Example 6. A film of 40 nm thickness of silicon oxide $SiO_2$ doped with boron is deposited by radio frequency as before in two sequential depositions of 20 nm each. Each of the two depositions is followed by a treatment by oxygen ion beam under the same conditions as Example 6. Here again, the durability of the film is very substantially improved.

Mass spectrometry measurements were carried out by a SIMS apparatus (SIMS is an English abbreviation for Secondary Ion Mass Spectroscopy), of a "standard" film of $SiO_2$ doped with boron of 40 nm thickness, deposited in a single operation without treatment (See FIG. 4) and the film of Example 7 (See FIG. 3). In these FIGS. 3 and 4 there are shown, on the abscissa, the thicknesses of the films in question, expressed in micrometers. On the ordinate, in known manner, are shown the intensities of secondary ions expressed in impacts per second of the measurements. In each of them, there are shown the curves termed "Si" which correspond therefore to the silicon content in the oxide.

It can be very clearly seen in FIG. 3 that the "Si" curve has a certain deflection in the middle of the thickness of the film, which represents the presence of a kind of "interface" between the films deposited in each of the two sequential depositions. In FIG. 4, in contrast, no deflection of this type can be discerned. This is therefore proof that the films deposited and treated according to this invention are modified structurally and can retain the trace of the treatments which they have undergone, at least superficially in the interface zone between sequential deposits. The curves corresponding to aluminum "Al" and to tungsten "W" indicate simply that these impurities are present in the sputtering enclosures. They would certainly disappear if other types of deposition equipment were used.

In conclusion, the process according to this invention enables the durability of a thin film comprising one or more metallic oxides, nitrides, oxynitrides or oxycarbides to be very clearly improved, without imposing constraints that would render impracticable its application to a series production of substrates of large dimensions. This hardening appears to be due to a phenomenon of densification within the thickness of the film, perhaps combined with a modification to the surface of the film, notably a smoothing effect. Furthermore, the process offers great flexibility in carrying it out, because it is possible to optimize, independently or otherwise, the treatment by ion beam by dissociating it from the deposition operation proper or choosing, in contrast, to carry out the deposition at the same time.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for increasing the chemical or physical durability of a film deposited on a transparent substrate by a reactive cathodic sputtering technique comprising:

subjecting the film after the deposition to an ion beam wherein the energy of the ions at impact on the film is 200 eV or less, and obtaining a film having a root mean square rugosity of 1.4 nm or less, wherein the deposition of the film is carried out in sequential steps and at least one of the sequential deposition steps is followed by at least one step of treatment with said ion beam, and wherein said film comprises a member selected from the group consisting of titanium oxide, titanium nitride, tantalum oxide, tin oxide, zinc oxide, silicon oxide and silicon nitride.

2. The process according to claim 1, wherein the deposition of the film is preceded by a step of pretreating the substrate with an ion beam.

3. The process according to claim 1, wherein at least a portion of said ion beam is selected from the group consisting of ionized oxygen, argon, ionized argon and ionized nitrogen.

4. The process of claim 1 wherein said energy is between 200 and 50 electron-volt.

5. The process of claim 1 wherein said energy is between 80 and 100 electron-volt.

6. The process according to claim 1, wherein the ion beam current density is from 1 to 2.2 mA/cm$^2$.

7. The process according to claim 1 wherein, said film has a final thickness of at least 30 nm and each step of sequential deposition is 15 to 25 nanometers; and each deposition step is followed by said ion beam treatment step.

8. The process according to claim 1 wherein each sequential deposition step has a duration of at most 30 minutes.

9. The process of claim 7 wherein each deposition step has a duration between 1 and 10 minutes.

10. A process for the production of panes containing at least one treated film comprising:

forming a film comprising a member selected from the group consisting of titanium oxide, titanium nitride, tantalum oxide, tin oxide, zinc oxide, silicon oxide and silicon nitride on a pane, followed by:

subjecting the film to an ion beam, wherein the energy of the ion beam at impact on the film is 200 eV or less and obtaining panes having a root mean square rugosity of 1.4 nm or less;

wherein the deposition of the film is carried out in sequential steps and at least one of the sequential deposition steps is followed by at least one step of treatment with said ion beam.

11. The process of claim 1, wherein the film has a final thickness of less than 30 nm and each step of sequential deposition is approximately 5 nm; and each deposition step is followed by said ion beam treatment step.

12. A process comprising:

forming a film on a transparent substrate by reactive cathodic sputtering, followed by subjecting the film to an ion beam, thereby forming a film with a root mean square rugosity of 1.4 nm or less, wherein the energy of the ions at impact on the film is 200 eV or less, and the film comprises a material selected from the group consisting of titanium oxide, titanium nitride, tantalum oxide, tin oxide, zinc oxide, silicon oxide and silicon nitride, and the deposition of the film is carried out in sequential steps and at least one of the sequential deposition steps is followed by at least one step of treatment with said ion beam.

* * * * *